(12) United States Patent
Saccomanno et al.

(10) Patent No.: US 6,266,473 B1
(45) Date of Patent: Jul. 24, 2001

(54) REFLECTIVE DISPLAY

(75) Inventors: Robert J. Saccomanno, Montville; Ivan B. Steiner, Ridgewood, both of NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/013,660

(22) Filed: Jan. 26, 1998

Related U.S. Application Data

(60) Provisional application No. 60/051,546, filed on Jul. 2, 1997, and provisional application No. 60/037,842, filed on Feb. 7, 1997.

(51) Int. Cl.⁷ .................................................. G02B 6/00
(52) U.S. Cl. ............................ 385/140; 385/14; 385/31; 385/37; 385/147; 385/901
(58) Field of Search .................................. 385/5, 14, 15, 385/27, 31, 140, 17, 131, 901, 147, 37

(56) References Cited

U.S. PATENT DOCUMENTS

| | | | |
|---|---|---|---|
| 3,614,192 | 10/1971 | Preston, Jr. | 350/3.5 |
| 3,674,336 | 7/1972 | Kogelnik | 385/37 X |
| 3,867,639 | 2/1975 | Engel | 250/550 |
| 3,885,856 | 5/1975 | Ostrowsky et al. | 385/37 X |
| 3,953,129 | 4/1976 | Hildebrand | 356/109 |
| 3,977,763 | 8/1976 | Ostrowsky et al. | 385/37 X |
| 4,118,106 | 10/1978 | Leith | 385/33 X |
| 4,118,124 | 10/1978 | Matsuda | 356/107 |
| 4,272,192 | 6/1981 | Matsuda | 356/347 |
| 4,412,719 | 11/1983 | Fienup | 385/37 X |
| 4,547,037 | 10/1985 | Case | 350/3.75 |
| 4,586,781 | 5/1986 | Gunther et al. | 385/37 X |
| 4,655,540 | 4/1987 | Wood et al. | 350/3.7 |
| 4,662,711 | 5/1987 | Tada et al. | 385/14 X |
| 4,688,879 | 8/1987 | Fairchild | 350/3.7 |
| 4,711,512 | 12/1987 | Upatnieks | 350/3.7 |
| 4,773,719 | 9/1988 | Anderson et al. | 385/11 X |
| 4,794,585 | 12/1988 | Lee | 369/112 |
| 4,807,978 | 2/1989 | Grinberg | 350/3.73 |
| 4,818,045 | 4/1989 | Chang | 385/129 X |
| 4,874,214 | 10/1989 | Cheysson et al. | 350/3.7 |
| 4,879,167 | 11/1989 | Chang | 428/215 |
| 4,929,044 | 5/1990 | Arimoto et al. | 350/96 |
| 4,946,253 | 8/1990 | Kostuck | 385/129 X |
| 4,960,314 | 10/1990 | Smith et al. | 350/3.7 |
| 4,993,789 | 2/1991 | Riles et al. | 350/3.7 |
| 4,998,786 | 3/1991 | Friesem et al. | 350/3.7 |
| 5,009,483 | * 4/1991 | Rockwell, III | 385/901 X |
| 5,011,244 | 4/1991 | Smith et al. | 350/3.75 |
| 5,013,107 | 5/1991 | Biles | 350/3.7 |
| 5,040,864 | 8/1991 | Hong | 385/16 |
| 5,061,027 | 10/1991 | Richard | 385/14 |
| 5,071,210 | 12/1991 | Arnold et al. | 359/19 |
| 5,071,232 | 12/1991 | Kato et al. | 359/315 |

(List continued on next page.)

FOREIGN PATENT DOCUMENTS

| | | | |
|---|---|---|---|
| 0 501 761 | 9/1992 | (EP) | 385/901 X |
| WO 94/23244 | 10/1994 | (WO) | 385/901 X |

OTHER PUBLICATIONS

Tsukuba Research Laboratory, Technical Research Institute Toppan Printing Co., Ltd.; Atsushi Sato, Luis M. Murillo–Mora and Fujio Iwata; Holographic Reflector for Reflective LCD's; Jan. 4, 1995; pp. 293–299; vol. 3010.

(List continued on next page.)

*Primary Examiner*—Brian Healy
(74) *Attorney, Agent, or Firm*—Loria B. Yeadon

(57) ABSTRACT

A reflective display can be configured around a waveguide illuminated with collimated light. A variety of light sources, light valves, light extracting devices, and light redirecting means may be employed to complete the display. The light extracting devices, light valves, and light redirecting means cooperate to selectively extract, attenuate, and redirect selected portions of the light in specific locations within the display.

36 Claims, 12 Drawing Sheets

U.S. PATENT DOCUMENTS

| | | | |
|---|---|---|---|
| 5,089,903 | 2/1992 | Kuwayama et al. | 359/15 |
| 5,103,323 | 4/1992 | Magarinos et al. | 359/8 |
| 5,106,174 | 4/1992 | Smith | 359/19 |
| 5,112,121 | 5/1992 | Chang et al. | 359/15 |
| 5,124,815 | 6/1992 | Chang | 359/10 |
| 5,151,800 | 9/1992 | Upatnieks | 359/14 |
| 5,162,927 | 11/1992 | Moss et al. | 359/3 |
| 5,166,813 | 11/1992 | Metz | 359/15 |
| 5,212,572 | 5/1993 | Krantz et al. | 359/15 |
| 5,224,198 | 6/1993 | Jachimowicz | 385/133 |
| 5,237,434 | 8/1993 | Feldman et al. | 359/19 |
| 5,243,449 | 9/1993 | Smith | 359/13 |
| 5,268,985 | 12/1993 | Ando et al. | 385/129 |
| 5,272,551 | 12/1993 | Lehureau et al. | 359/19 |
| 5,282,066 | 1/1994 | Yu et al. | 359/3 |
| 5,293,272 | 3/1994 | Jannson et al. | 359/1 |
| 5,295,208 | 3/1994 | Caulfield et al. | 385/27 |
| 5,331,445 | 7/1994 | Dickson et al. | 359/15 |
| 5,335,300 | 8/1994 | Hartman et al. | 385/37 |
| 5,339,179 * | 8/1994 | Rudisill et al. | 359/49 |
| 5,341,230 | 8/1994 | Smith | 359/13 |
| 5,347,435 | 9/1994 | Smith et al. | 362/80.1 |
| 5,396,350 | 3/1995 | Beeson | 359/40 |
| 5,418,631 | 5/1995 | Tedesco | 359/15 |
| 5,450,378 | 9/1995 | Hekker | 369/102 |
| 5,455,693 | 10/1995 | Wreede et al. | 359/15 |
| 5,465,311 | 11/1995 | Caulfield et al. | 385/27 |
| 5,471,326 | 11/1995 | Hall et al. | 359/15 |
| 5,471,328 | 11/1995 | Wreede | 359/22 |
| 5,477,348 | 12/1995 | Yamagishi et al. | 359/19 |
| 5,481,383 | 1/1996 | Morishima et al. | 359/15 |
| 5,485,291 * | 1/1996 | Qiao et al. | 359/49 |
| 5,493,425 | 2/1996 | Yang | 359/15 |
| 5,500,912 | 3/1996 | Alonas et al. | 385/37 |
| 5,506,701 | 4/1996 | Ichikawa | 359/15 |
| 5,515,184 | 5/1996 | Caulfield et al. | 359/34 |
| 5,550,654 | 8/1996 | Erdogna et al. | 359/3 |
| 5,568,574 | 10/1996 | Tanguay et al. | 385/14 |
| 5,602,657 | 2/1997 | Dickson et al. | 359/15 |
| 5,610,734 | 3/1997 | Aharoni et al. | 359/16 |
| 5,621,547 | 4/1997 | Loiseaux et al. | 359/15 |
| 5,638,469 | 6/1997 | Feldman et al. | 385/14 |
| 5,745,271 * | 4/1998 | Ford et al. | 359/130 |
| 5,926,601 * | 7/1999 | Tai et al. | 385/146 |
| 5,970,201 * | 10/1999 | Anthony et al. | 385/140 |

OTHER PUBLICATIONS

New Display Technologies; Reprinted from Information Display, Apr./May 1996; Robert L. Saxe and Robert I. Thompson; Suspended–Particle Devices; no page numbers.

Semiconductor International, European Report; Brian Dance; British Develop Full–Color Miniature Ferroelectric Display, 2/97; no page number.

* cited by examiner

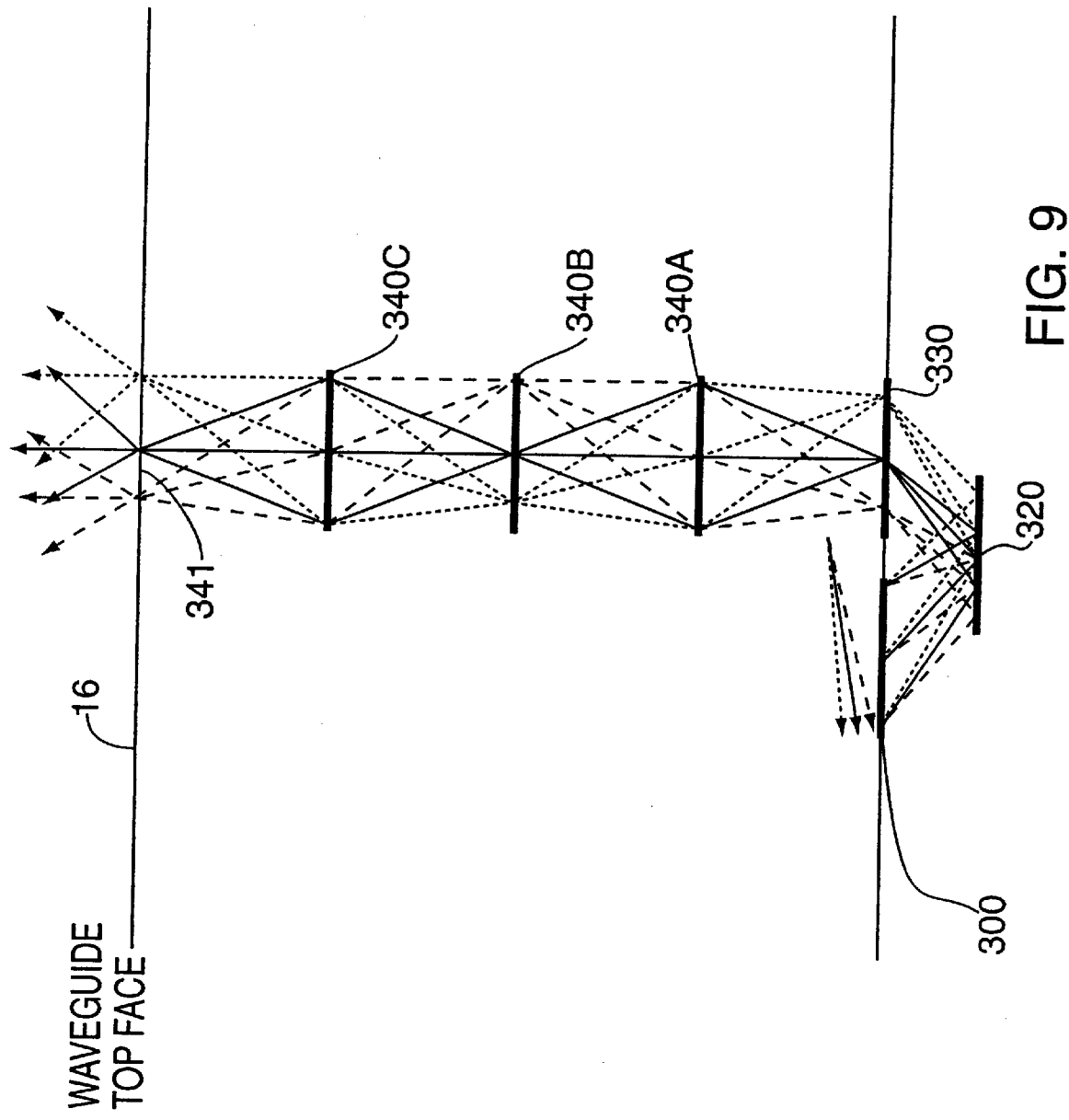

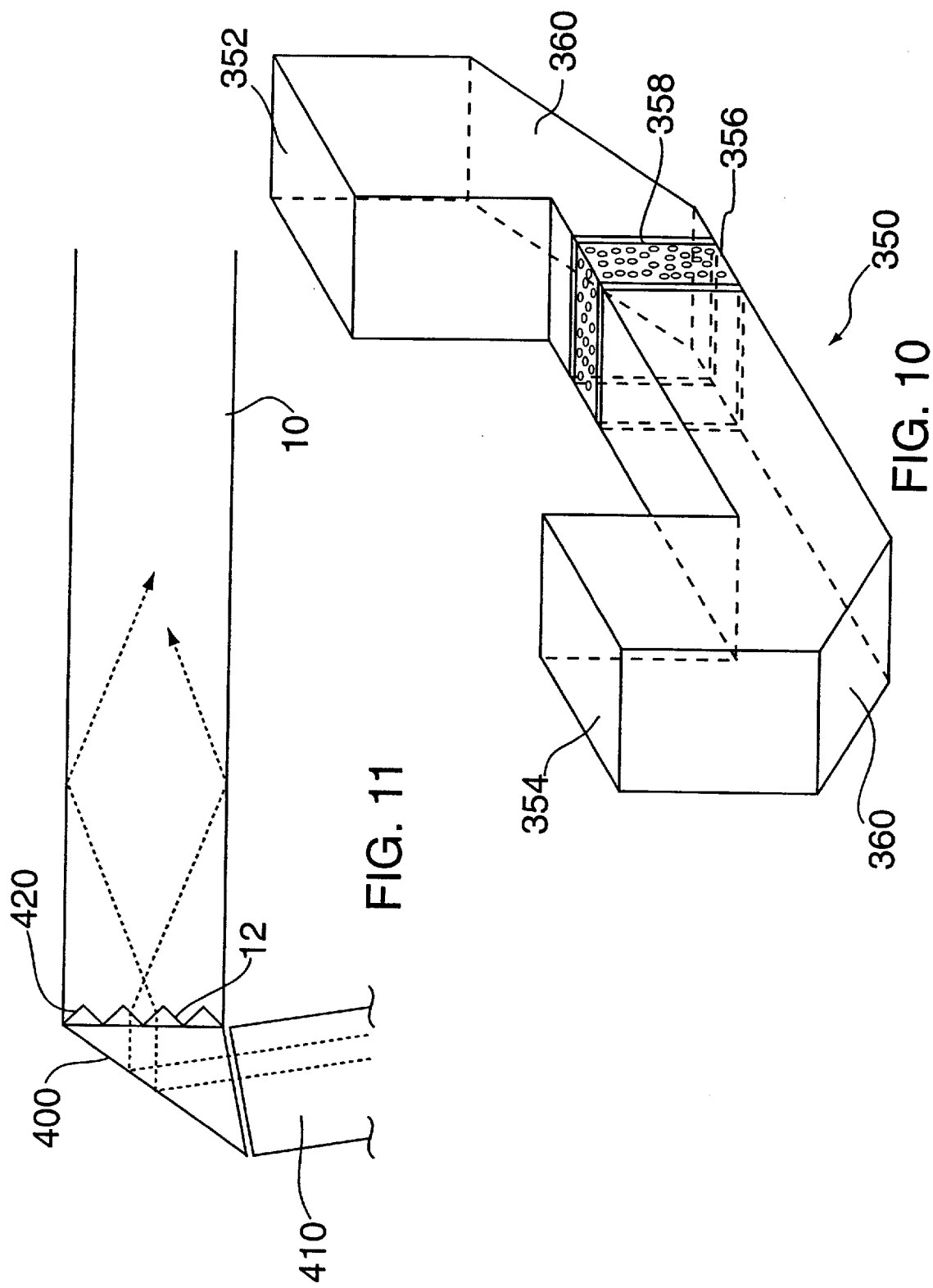

REFLECTIVE DISPLAY

CROSS REFERENCE TO RELATED APPLICATION

This application claims the benefit of U.S. Provisional Application Ser. No. 60/037,842 filed on Feb. 7, 1997, pending and U.S. Provisional Application Ser. No. 60/051,546 filed on Jul. 2, 1997, pending.

BACKGROUND OF THE INVENTION

The apparatus described herein relates to reflective displays and in particular reflective displays that utilize a variety of light valves.

Present displays generally lack one or more of the of the following characteristics attributable to video displays: compact packaging, high color resolution, higher monochrome resolution; high luminance; high color fidelity; wide gray scale dynamic range, high contrast, high degree of multiplexibility, sharpness, wide viewing angles and high ambient light rejection. It is difficult to obtain all of the above characteristics in a single display as a result of design tradeoffs that are inherent using current display technology.

For example, loss of display sharpness occurs when a generally poor collimated backlight is combined with a necessary separation gap between LCD pixels and a diffusion viewscreen. Alternatively, the absence of a separate viewscreen element requires the use of uncollimated light to provide an acceptable range of view angles. The use of uncollimated light passing through LCD pixels, however, causes undesirable color inversions and contrast loss at larger view angles. This effect is reduced by any of a wide variety of available compensation films. Such films, however, further reduce the luminance of the display. In many such cases contrast is greatly improved; however, the lower luminance reduces gray scale dynamic range.

Accordingly, there exists a need for a display that exhibits most, if not all of the referenced display characteristics.

BRIEF DESCRIPTION OF DRAWINGS

A more complete understanding of the present invention, as well as other objects and advantages thereof not enumerated herein, will become apparent upon consideration of the following detailed description and the accompanying drawings, wherein:

FIG. 9 is a cross-sectional diagram of a waveguide having volume holographic elements and gradient index lenses;

FIG. 10 is a perspective view of a U-shaped assembly for redirecting light;

FIG. 11 is a cross-sectional diagram of a turning prism for launching light into the waveguide of a reflective display;

DESCRIPTION OF THE INVENTION

The present invention is intended to overcome the deficiencies of the prior art, and at the same time provide a low cost display. The invention is designed to accept precollimated light from a remote high intensity, spatially concentrated light source to replace fluorescent lamps usually disposed to edgelight the display or placed behind the display. Most prior art backlighting means do not employ precollimated light. It has been determined by calculations of Etendue that large area light sources such as fluorescent lamps have a very limited capability to provide high luminance to a desirable degree for cockpit and other sunlight readable displays. Thus the invention is meant to use intense spatially concentrated light sources, such as metal halide HID that, by virtue of their superior Etendue properties, have the potential to provide the desired higher luminance.

Lower cost potential is provided by virtue of the fewer piece parts and the fewer fabrication steps required for holographic displays described by the invention.

Figure 1:
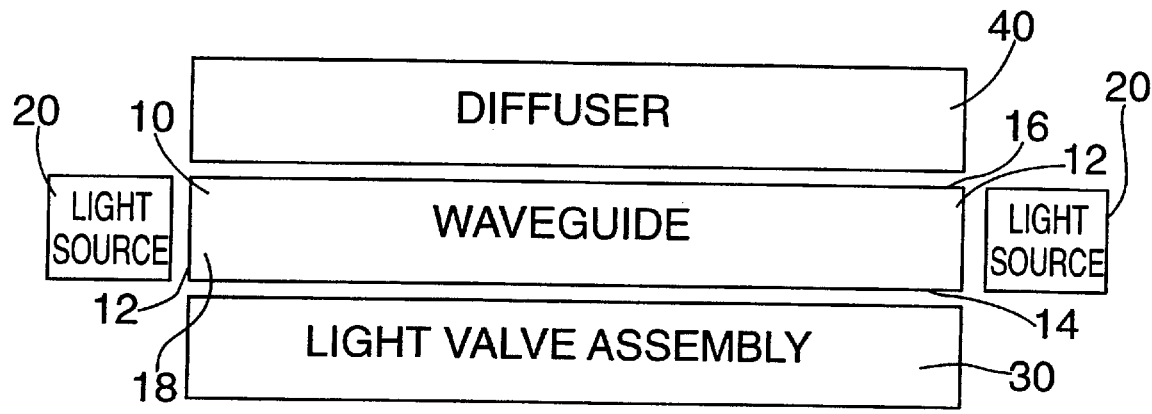
FIG. 1 is an elevation view of a reflective display.

A reflective display apparatus is illustrated in FIG. 1. The display has an optical waveguide 10 illuminated by a light source 20 generating collimated or nearly collimated light. For example, white light, precollimated to within a conical half angle of 6° (in air) can be utilized. Preferably, the light is plane polarized and injected into the waveguide 10 from two opposing input port edges 12 to improve the uniformity of light density across the length of the waveguide 10. This can be accomplished with either two separate sources or a single source and proper channeling of the light to both input port edges 12 of the waveguide 10. Electrodeless high intensity discharge and other high intensity discharge lamps, such as xenon and mercury xenon, and tungsten filament lamps, and other lamps capable of emitting light from a small volumetric region may be used for the source.

An electrically controlled light valve assembly 30, adjacent to the lower output surface 14 of the waveguide 10, accepts light extracted from the lower output surface 14 and attenuates and redirects the light. The light valve assembly 30 can be an absorptive, scattering, polarizing, variable refractive index mechanism operated to partially or fully pass light, or prevent the passage of light altogether. Regardless of the method of operation, the light valve assembly 30 redirects light back into the waveguide 10 and into an optional diffuser 40.

The waveguide 10 can be fabricated from a clear, refractive material such as glass or a plastic such as acrylic or polycarbonate. Total internal reflection will confine light within waveguide 10 until light is extracted through an output surface 14 and 16. The lower and upper output surfaces 14 and 16 of the waveguide 10 can be parallel or at an angle with respect to each other to form a taper. In the latter case, light would be injected into only end of the waveguide 10.

Figure 2:
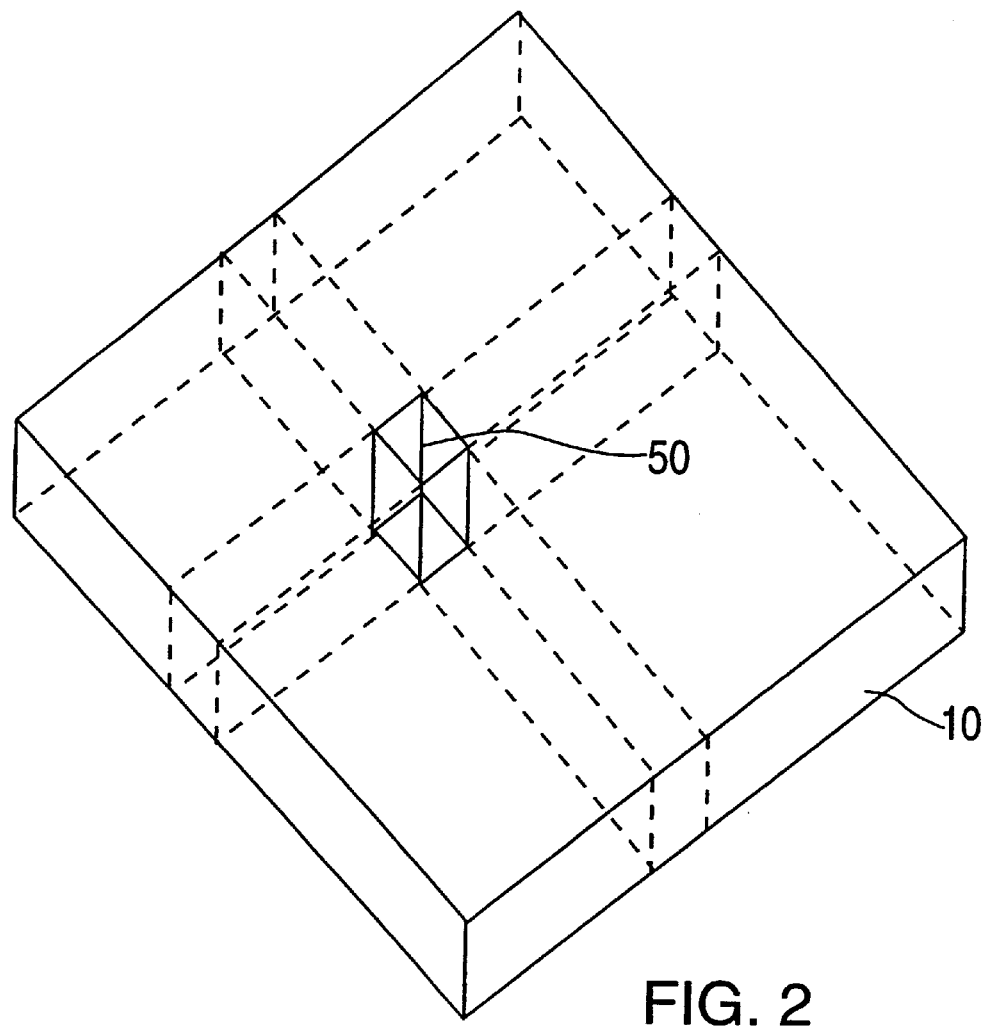
FIG. 2 is a partial perspective drawing of the waveguide of the display of FIG. 1.

As illustrated in FIG. 2, the waveguide 10 is subdivided into a matrix of individual resolution cells 50 of rectangular cross-section. The cross-sectional dimensions of the resolution cells 50 can be selected to correspond to a single pixel in a display. For example, in a 6×8 inch display, one might select a resolution cell having cross-sectional dimensions of 66μ×200μ, but of course other dimensions could be employed. If the resolution cells 50 are discrete elements, they could be optically isolated utilizing a material having a refractive index less than that of the material of the resolution cells 50. The resolution cells 50 can be arranged in a rectangular array of rows and columns, or staggered within either the rows or columns.

Figure 3A:
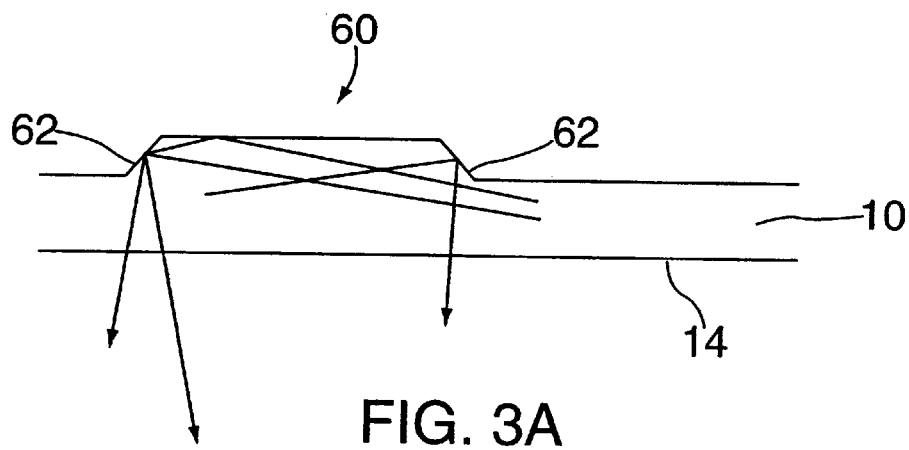
FIG. 3A is an elevation view of a waveguide having an alternative light extraction feature.
Figure 3:
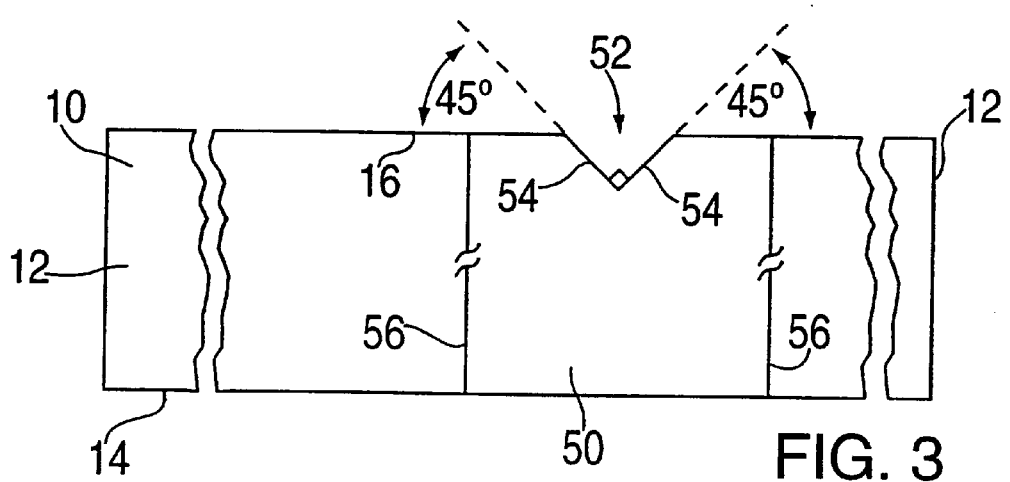
FIG. 3 is an elevation view of a cell of the waveguide.

As shown in FIG. 3, there is a V-groove or divot light extraction feature 52 embossed or molded into the upper output surface 16 of the waveguide 10. For example, the V-groove may have a depth of approximately 2μ. One or more light extraction features 52 are provided for each resolution cell 50. In the embodiment shown, the faces 54 of the V-groove can be normal to each other and form 45° angles with respect to the surface 16, but it should be understood that other angles could be selected. For purposes of illustration and explanation, the V-grooves are drawn in the figure much larger than they would physically appear relative to the thickness of the actual device.

The light enters through the input edges 12 of the waveguide 10 and propagates simultaneously in opposite directions through the waveguide 10. When light hits one of the faces 54 of a V-groove light extraction feature 52 at greater than the critical angle, it will be reflected off of the face 54 at an angle equal to the angle of incidence and directed towards the lower output surface 14 of the waveguide 10. If any such reflected light hits a side 56 of the resolution cell 50, the lesser index of refraction between resolution cells 50 and/or total internal reflection will confine the light energy to the resolution cell 50.

The thickness of the waveguide 10 and the depth of the V-groove light extraction features 52 are selected to optimize light extraction, efficiency, and uniformity of the display. As the thickness of the waveguide 10 increases and/or the depth of the V-groove light extraction features 52 decreases, display uniformity (the ratio of the difference of luminance variance to the sum of luminance variance, measured across the display face) will increase but waveguide extraction efficiency (the ratio of the waveguide lower output surface flux output to the waveguide flux input) will decrease.

Instead of a V-groove or divot light extraction feature 52, the trapezoidal light extraction feature 60 of FIG. 3A may be employed. When light traveling through the waveguide 10 impinges on one of the angled opposing sides 62 of the trapezoidal light extraction feature 60, it is reflected downwards towards and through the lower output surface 14 of the waveguide 10.

Figure 4:
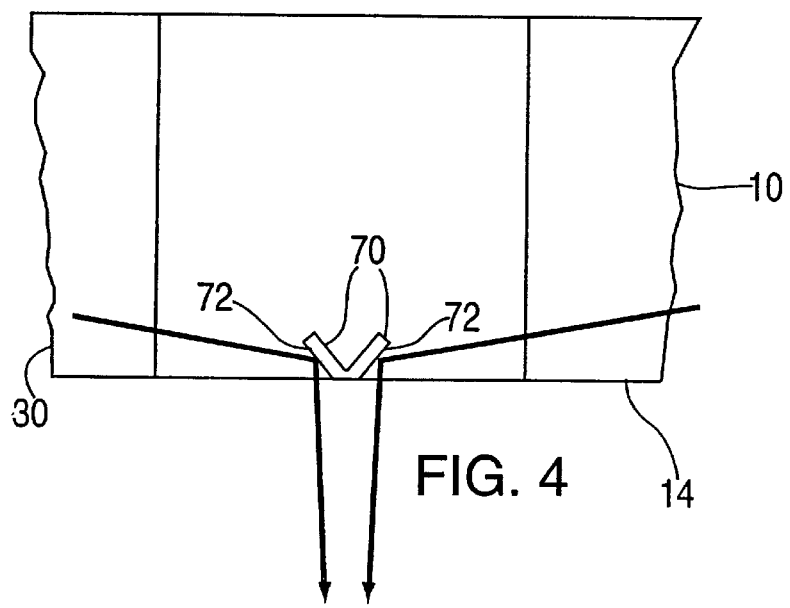
FIG. 4 is a cross-sectional diagram of a cell of the waveguide having an alternative reflective element.

Alternatively, the mechanism for extracting light from the waveguide 10 could be located on the lower output surface 14. Such a structure may use refractive, diffractive, or reflective elements or a combination thereof to redirect the light. For example, as illustrated in FIG. 4, opposing angular cuts 70 could be made on the lower output surface 14, where each cut presents a surface 72 exposed to air that totally internally reflects any light impinging on that surface 72. Alternatively, the surfaces 72 can be coated with a reflective material such as aluminum to reflect intercepted light. If the cuts were at 45° angles, the reflected light would propagate in a direction normal to the lower output surface 14 and pass to the light valve assembly 30.

The light valve assembly 30 can be any electrically controlled device that can selectively pass or, fully or partially prevent the passage of light. It may operate on an absorptive, scattering, polarizing, or variable refractive index basis. One such device is a scattering-type light valve such as a polymer-dispersed liquid crystal (PDLC). PDLCs are described in *Liquid Crystal Displays*, pp. 85–90, Stanford Resources, Inc. (1995), incorporated herein by reference. Although the PDLC is generally a monolithic sheet, it can be viewed as being subdivided into "resolution cells" or "pixels" corresponding in size and location to the resolution cells 50 of the waveguide 10.

Another form of light valve is a suspended-particle device (SPD). SPDs are described in Saxe and Thompson, "Suspended-Particle Devices," *Information Display*, April–May 1996, incorporated herein by reference. Ferroelectric and anti-ferroelectric liquid crystal displays, twisted nematic (TN) and supertwisted nematic (STN) active-matrix LCDs, electrophoretic devices, and optical phase shifters that alter the refractive index may also serve as light valves.

Figure 5:
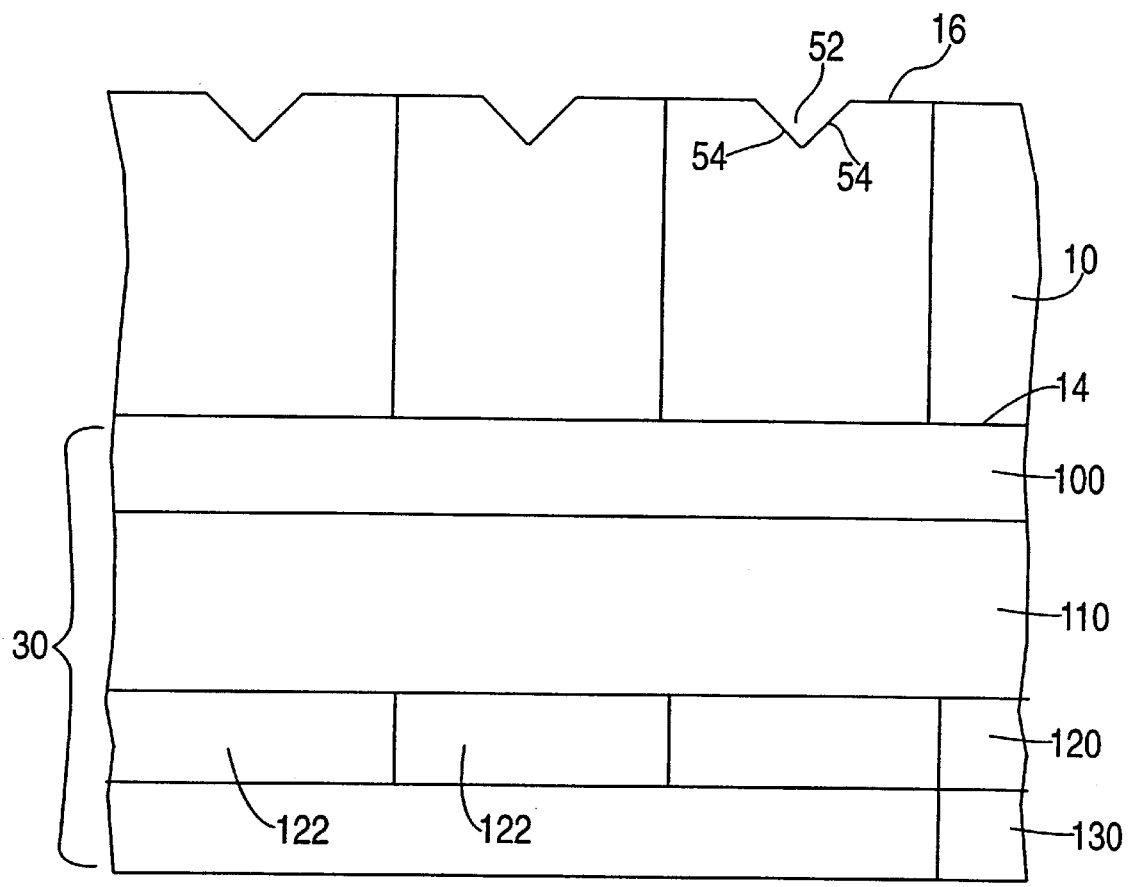
FIG. 5 is an elevation view of a reflective display having a light valve.

As illustrated in the cross-sectional diagram of FIG. 5, the light valve assembly 30 may comprise an electrode layer 100, such as a thin layer of ITO (indium tin oxide) or some other electrode material, adjacent to the lower output surface 14 of the waveguide 10, a light valve layer 110, a reflective layer 120 comprising a series of reflective pixel electrodes 122, electrically insulated from one another, and an underlying substrate 130 such as a printed circuit board (PCB). The PCB can be rigid or flexible to a greater or lesser degree as required by the application. The PCB can be manufactured using a variety of substrates, using either subtractive (e.g., etching) or additive processes, or a combination of those processes, to create electrical conductors. Additionally, the PCB can be used to integrate other electronic and optical devices, including, but not limited to light valve drive devices (not shown), other system electronics, and the light source 20 and its associated electronics.

The size and shape of the reflective pixel electrodes 122 in the reflective layer 120 would normally conform to the size and shape of the resolution cells 50 but could assume other configurations to suit the application. If the light valve assembly 30 is bonded to the lower output surface 14 of the waveguide 10, the adhesive used should have a refractive index less than that of the waveguide 10 in order to ensure that the precollimated light within waveguide 10 remains captive within the waveguide (owing to total internal reflections) until extracted by face 54 of a V-groove 52.

When a voltage is applied between the electrode layer 100 and a pixel electrode 122, an electric field is created between the two, altering the crystalline microstructure of the portion of the light valve 110 adjacent to the pixel electrode 122. As the applied voltage is changed, the structure will vary from a medium that nearly fully blocks the passage of light to one that partially attenuates the light rays to a clear device through which the light rays will freely pass. Alternatively, instead of static operation, a fast-acting on/off, i.e., binary, light valve can be operated with a varying duty cycle to achieve a desired light throughput over time.

When the light valve 110 is clear or nearly clear, light exiting the lower output surface 14 of the waveguide 10 will pass through the light valve 110 until it reaches a reflective pixel electrode 122 and is reflected back through the light valve 110. Ultimately, the light will pass out of the waveguide 10 through the upper output surface 16, unless it is reflected off of a face 54 of a V-groove feature 52. It should be understood that the light reflected by the V-groove face 54 is a relatively small percentage of the light reflected by the pixel electrode 122 and in any event will be recycled within the waveguide 10.

Figure 6:
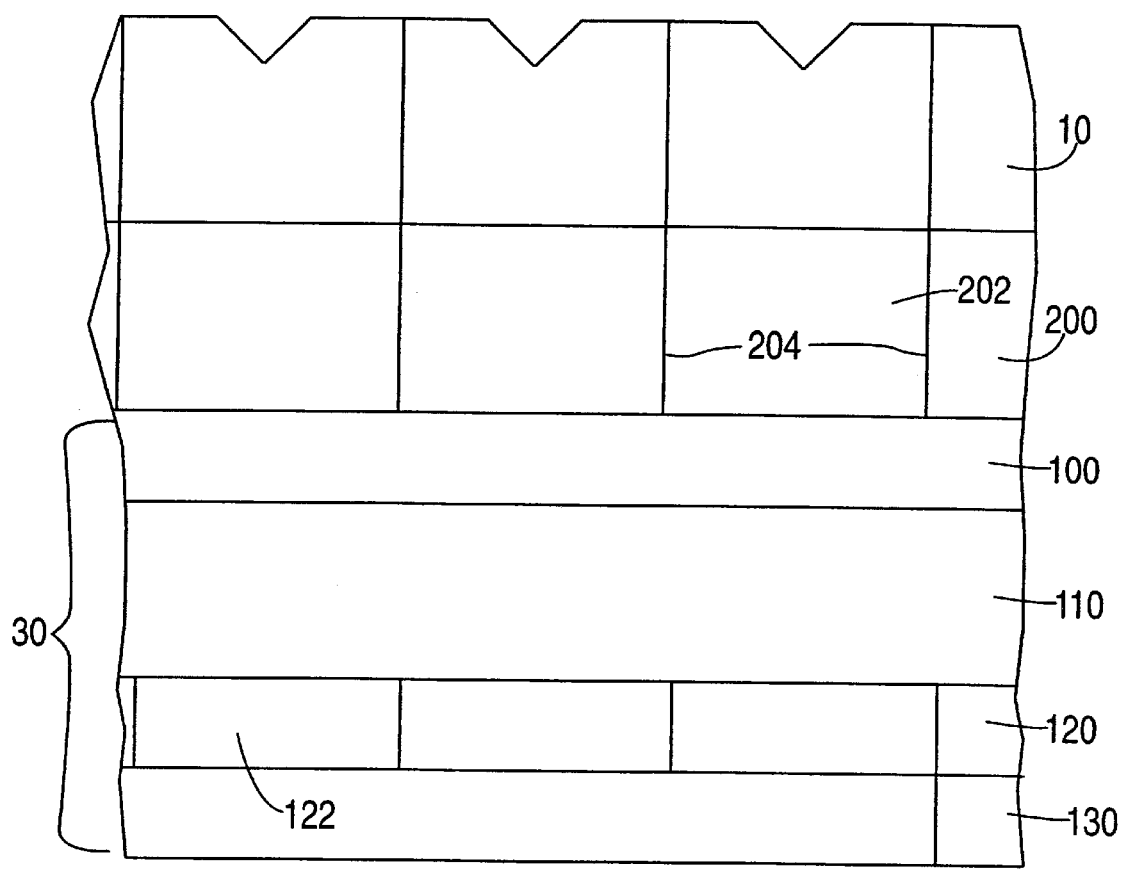
FIG. 6 is an elevation view of a reflective display having a second waveguide.

To further increase the optical isolation between adjacent resolution cells, a second waveguide assembly 200 of corresponding resolution cells 202 can be placed between the first waveguide 10 and the electrode layer 100 of the light valve assembly 30, as shown in FIG. 6. The walls 204 of the resolution cells 202 in the second waveguide 200 can be coated with a low refractive index transparent layer followed by a light-absorptive material such as black resin to totally internally reflect the unscattered collimated rays while it absorbs the scattered uncollimated rays, thus preventing the latter from entering an adjacent resolution cell 202. Alternatively, a low refractive index black resin could be employed alone. The depth of the resolution cells 202 in the second waveguide 200 can be increased to limit the passage of less closely collimated light rays.

The diffuser 40 (FIG. 1) can be any device that will accept light rays from the upper output surface 16 of the waveguide 10 and diffuse them to the degree desired for the particular application. Suitable diffusers are described in copending U.S. patent application entitled "Optical Structures for Diffusing Light" by Beeson et al., filed Dec. 2, 1996 as U.S. patent application Ser. No. 08/759,338; U.S. Pat. No. 5,462,700, issued Oct. 31, 1995, to Beeson et al., for a Process for Making an Array of Tapered Photopolymerized Waveguides; U.S. Pat. No. 5,481,385, issued Jan. 2, 1996, to Zimmerman et al., for a Direct View Display with Array of Tapered Waveguides; and U.S. Pat. No. 5,696,865 to Beeson et al. for an Optical Waveguide Having Two or More Refractive Indices and Method of Manufacturing Same, all foregoing are assigned to the same assignee as the present patent application and are incorporated herein by reference. In particular, the tapered waveguides can be surrounded by light-absorptive black particulate material or black absorptive coating to reduce glare from ambient light and improve contrast.

Figure 7:
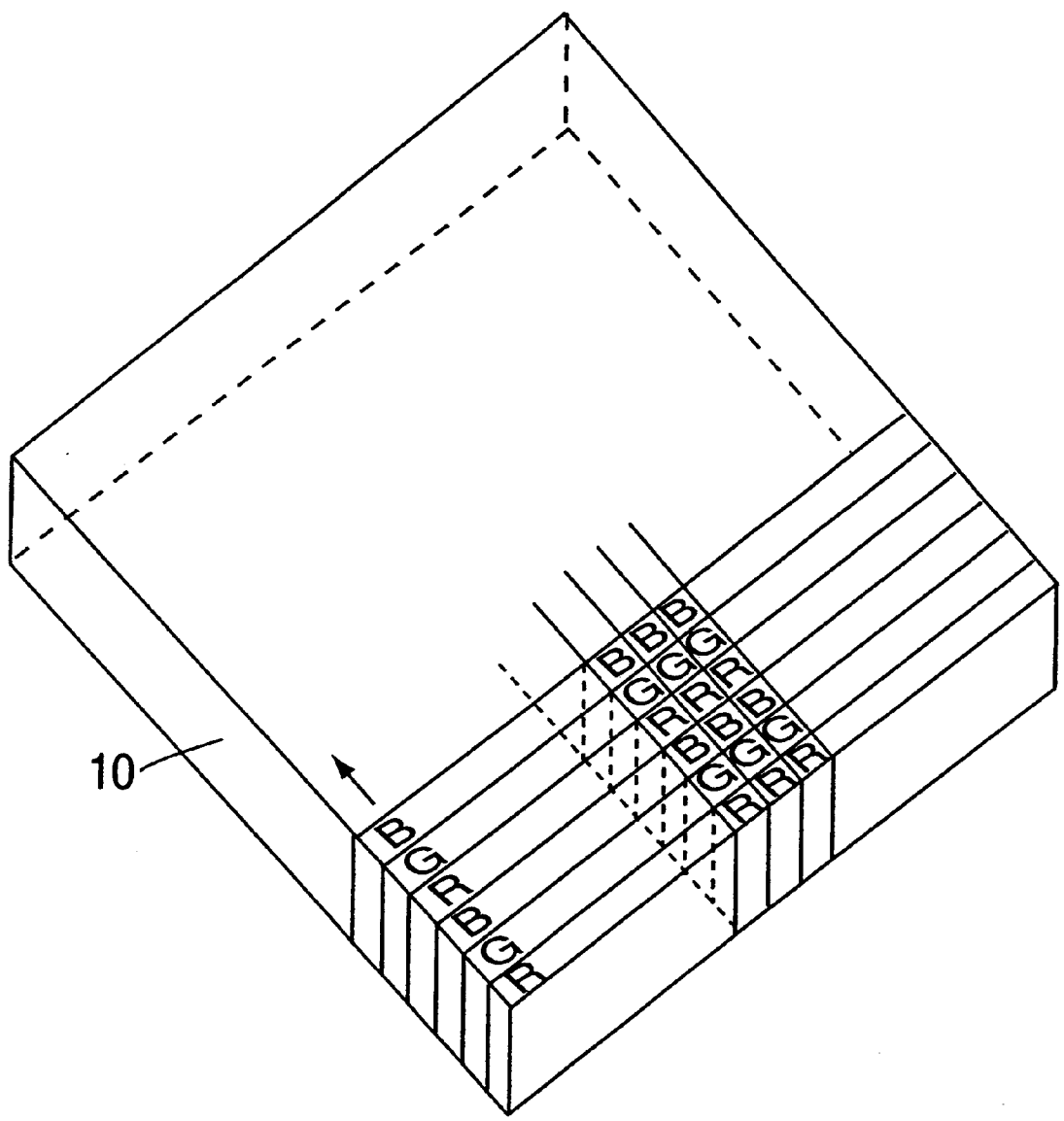
FIG. 7 is a partial perspective drawing of the waveguide of a color display.

The reflective display can be configured to provide color output. The light from the light source 20 can be spectrally divided into three visible light primary color bands (e.g., red, green, blue). The individual colors could then be routed along separate paths to individual alternating rows of red, blue, and green, as shown in FIG. 7. The individual colors would be selected on a pixel-by-pixel basis to have a resolution cell pass or scatter the colored light as necessary, using multiplexing techniques, well known to those skilled in the art, to control the light valve assembly. By alternating between color and monochrome inputs, the device can offer both color and monochrome output and varying degrees of resolution.

Figure 8:
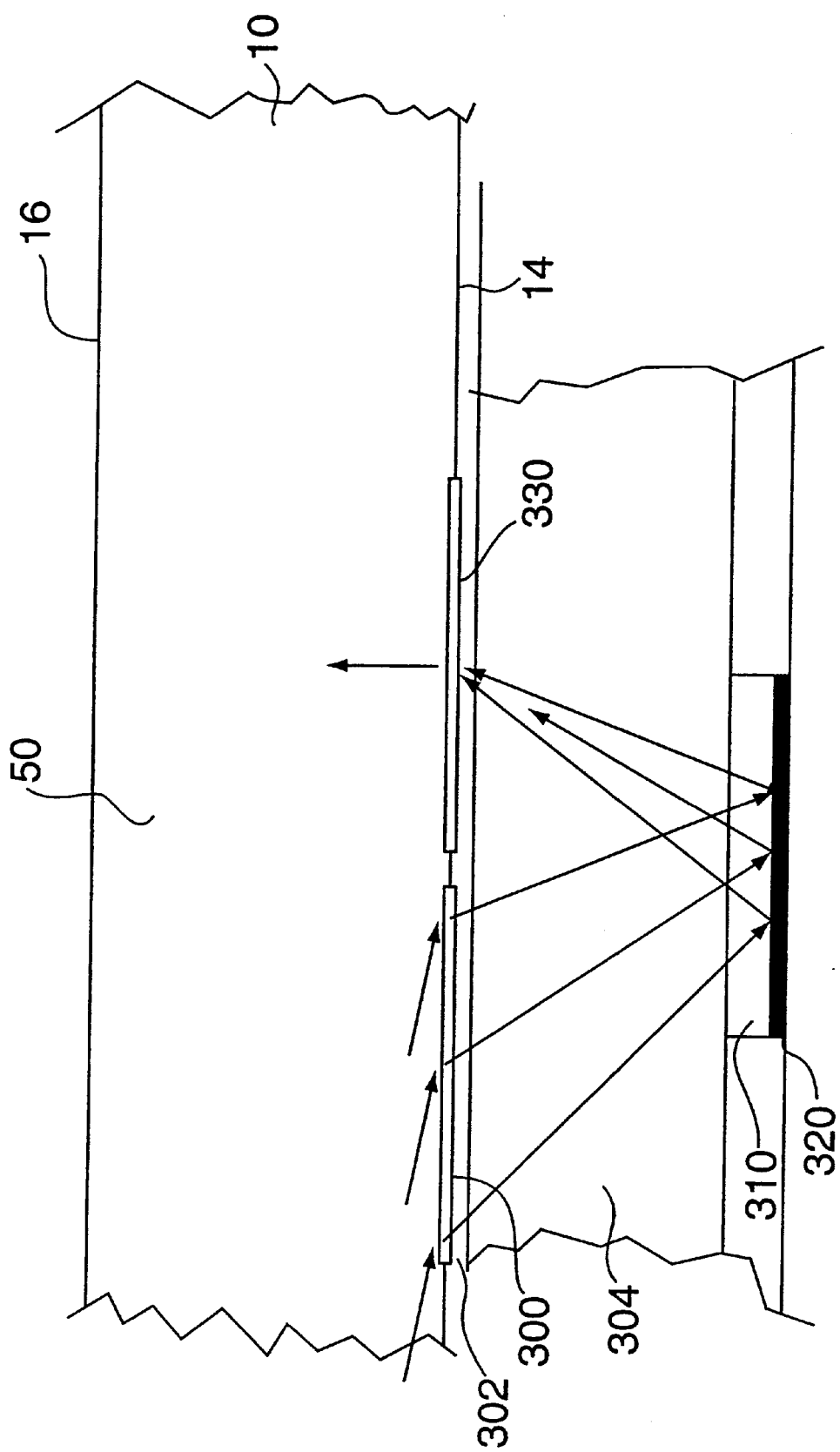
FIG. 8 is an elevation view of a reflective display with volume holographic elements.

Another alternative display apparatus uses volume or surface hologram elements to extract and direct the light. A color-selective transmitting separate phase-only volume or surface hologram element is provided for each color and each pixel to extract light from the waveguide. Holographic elements are described in Caulfield, H. J., and Lu, S., *The Applications of Holography*, New York: John Wiley & Sons, Inc.: 1970, pp. 43–49, incorporated herein by reference. As shown in FIG. 8, a holographic element 300 is located on the lower output surface 14 of the waveguide 10. The holographic element 300 is designed to pass a specific wavelength or a range of wavelengths of light, for example, corresponding to a red, green, or blue primary color that arrives at the holographic element 300 in a predetermined range of propagation directions.

Figure 8A:
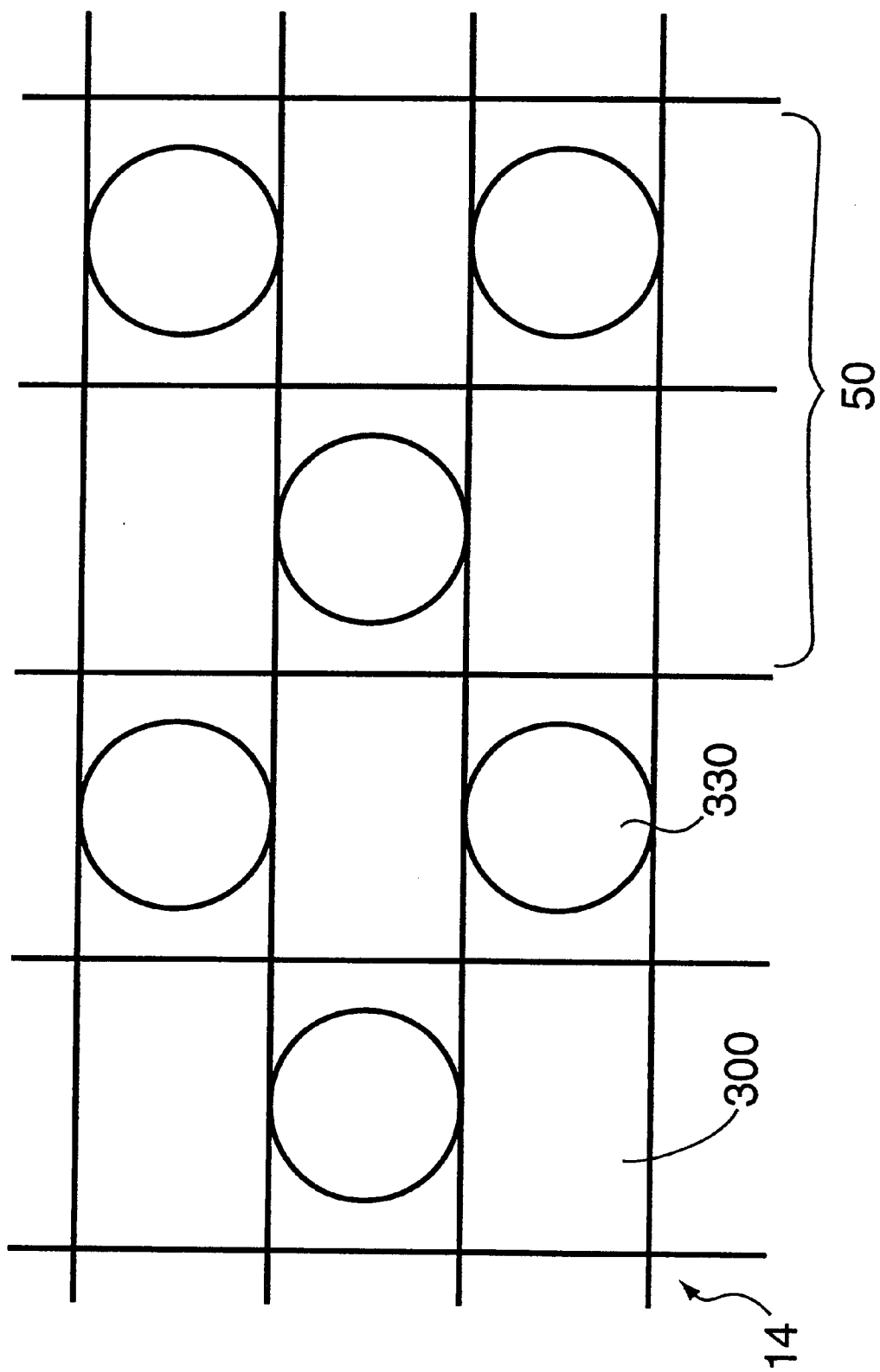
FIG. 8A is an illustration of the lower output surface of the waveguide of FIG. 8, illustrating an arrangement of the volume holographic elements and the adjacent gradient index lenses.

The lower output surface 14 of the waveguide 10 is shown in FIG. 8A, illustrating an arrangement of holographic elements 300 and adjacent gradient index lenses 330. Each holographic element 300 cooperates with an adjacent gradient index lens 330 to create a resolution cell 50. To accommodate a holographic element and a gradient index lens, a resolution cell can have an aspect ratio of 3:1 and dimensions of 66 $\mu$m×200 $\mu$m, although other ratios and dimensions may be selected to suit the application. Alternatively, the gradient index lenses 330 may extend beyond the boundaries of the resolution cells 50 provided there is no overlap of adjacent lenses.

Referring again to FIG. 8, the light of a predetermined range of wavelengths and incidence angles will pass through the holographic element 300. The holographic element 300 focuses and directs the light across an air gap or other low refractive index material 302, through an optional refractive medium 304, and through a light valve 310, such as a PDLC, an SPD, or some other suitable light attenuating mechanism, to regulate the amount of light in a respective resolution cell 50 of FIG. 8a, until the light finally reaches a reflective pixel electrode 320.

The reflective pixel electrode 320 reflects the light back through light valve 310 towards the lower output surface 14 of the waveguide 10 to a point on the lower output surface 14 of the waveguide 10, at the focal point of the holographic element 300, where there is a first gradient index lens 330. Depending on the degree of attenuation of light valve 310, nearly all, a portion, or almost no light will be transmitted to lens 330 by light valve 310.

It should be understood that the first gradient index lens 330 may be fabricated immediately above or beneath the surface of the waveguide 10 or within the waveguide itself using techniques well known in the art or on the surface of the optional refractive medium 304. The first gradient index lens 330 focuses and directs the light towards the upper output surface 16, in a direction normal to the surface 16. A volume or surface holographic element may used in lieu of the first gradient index lens 330.

From the first gradient index lens 330 on the lower output surface 14, a series of internal gradient index lenses 340a–c refocus and direct the light upwards, as shown in FIG. 9. The focal length of the individual lenses 340 and the vertical spacing therebetween are selected to insure that the bundles of light traveling to the upper output surface 16 of the waveguide 10 do not overlap with one another thus avoiding cross-talk between adjacent resolution cells.

A shorter focal length can be selected for the last gradient index lens 340c to make its focused image area 341 at the upper output surface 16 smaller. Preferably, output surface 16 is covered with a black matrix with the exception of the surface area occupied by the image area 341. The smaller image will allow the black matrix material on the waveguide top face to occupy a greater area to reduce ambient light reflection or scattering from the display. Additionally, the axes of the converging light bundles from the top lenses, corresponding to the red, green, and blue primary colors, can be deflected to superimpose their respective focal points and create a tri-color pixel or resolution cell location on the waveguide top face.

In lieu of the light valve 310 and the reflective pixel electrode 320 of FIG. 8, a U-shaped channel assembly 350, illustrated in FIG. 10, can be employed to channel light from the light extraction hologram to grin lens 330 of FIG. 9. The channel assembly 350 has an input face 352, an output face 354, a light valve layer 356, bounded by ITO or some other electrode material layers 358, and two angle surfaces 360. The light valve layer 356 can be a PDLC, an SPD, or some other suitable light-attenuating device. The angle surfaces 360 act as reflectors operating by TIR. Alternatively, if TIR is partial or absent, surfaces 360 may have a reflective coating such as aluminum. Light enters channel assembly 350 through input face 352 and exits through output face 354. Light valve layer 356 is electrically controlled to vary the light throughput of the channel assembly 350. When a scattering-type light valve, such as a PDLC, is employed for the light valve layer 356, a black film or particulate coating can be applied to all surfaces of the channel assembly 350 except the input, output and angle surfaces 352, 354, and 360 to absorb scattered light within the assembly 350 and thereby enhance display contrast.

Referring again to FIG. 1, to minimize space requirements around the display edges, a turning prism 400 can be used to channel light to the waveguide 10. This turning prism 400, shown in FIG. 11, accepts light from a light pipe 410 and redirects the light to the waveguide 10. To deflect the direction of the precollimated light entering the waveguide 10 and increase the number of total internal reflections within the waveguide, an optional serrated input surface 420, or a diffraction grating, a volume or surface holographic coating, or a binary optic surface can be employed on the input port edges 12 of the waveguide 10 to alternately deflect the collimated rays upwardly and downwardly as they enter the waveguide 10. For example, the serrated edges can form a 90° angle with respect to each other and have a pitch of 50 serrations per inch. It should be understood that the serrated surface could be located on the waveguide 10 proper or on a separate element adjacent to the waveguide 10. The separate element could be attached by an optical adhesive or there may be a small air gap between the element and the waveguide 10.

Figure 12:
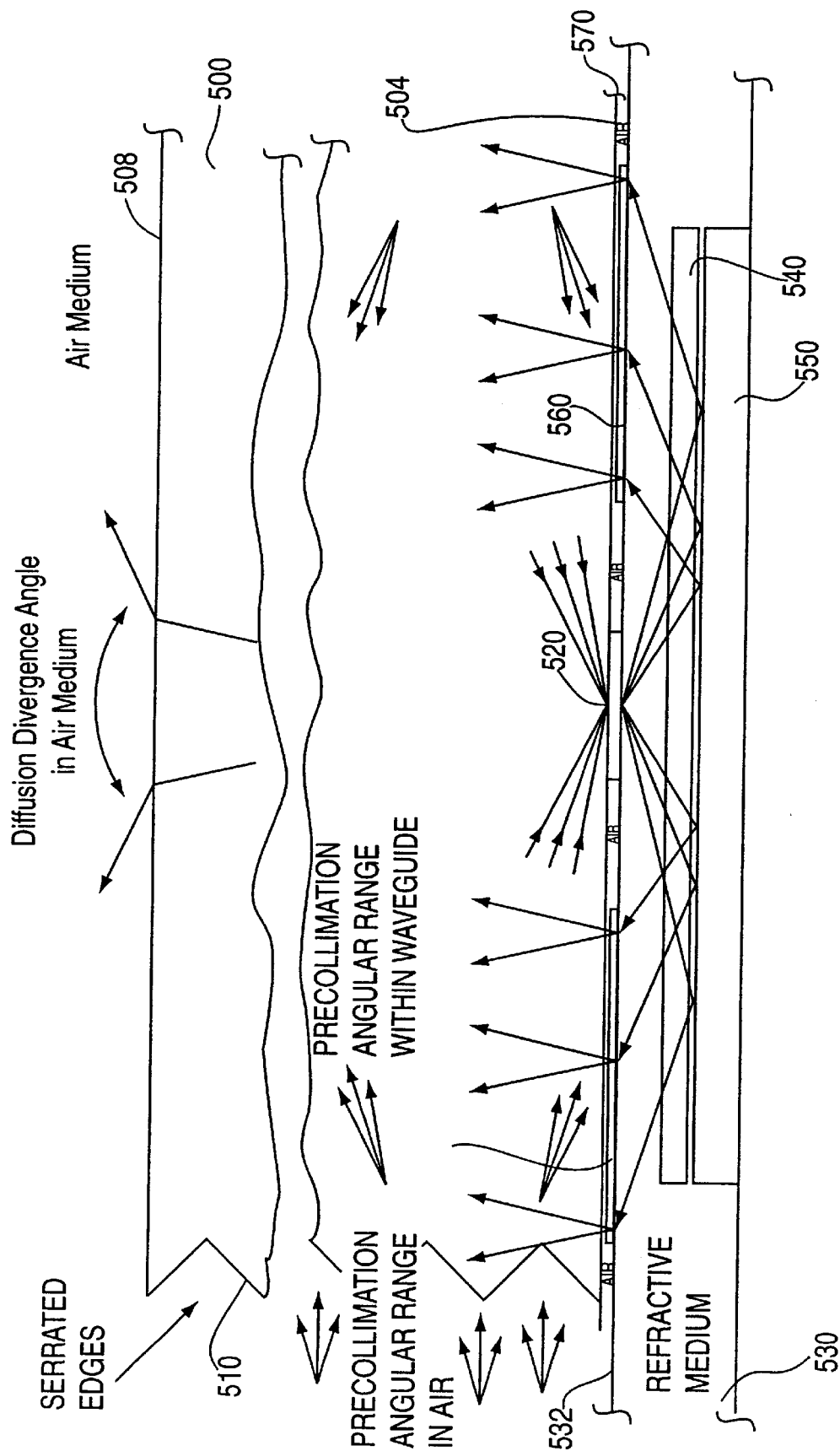
FIG. 12 is an elevation view of a reflective display utilizing bandpass light filters and volume holographic elements.

Color-selective light extraction can be achieved with a bandpass light filter, as illustrated in FIG. 12. Light enters the waveguide 500 through an optionally serrated edge 510. Light travels through the waveguide, reflecting off the surfaces of the waveguide 500 until light reaches the bandpass filter 520 on lower surface 504. Bandpass filter 520 can be a dichroic filter, a transmitting, phase-only volume holographic element, or some other wavelength-selective device that will pass a specific range of wavelengths while almost completely reflecting all others.

The filter 520 will transmit a selected band of light wavelengths into refractive medium layer 530 while reflecting wavelengths outside the selected band. The transmitted light passes through valve 540 and is reflected by electrode assembly 550 in a functionally similar manner as the corresponding elements of FIG. 8. The redirected light then passes back into the waveguide 500 through a holographic transmissive directional diffuser element 560 and air gap 570 between the element 560 and the lower surface 504 of the waveguide 500. Holographic element 560 alters the propagation direction of light rays and also diffuses the light. As a result, the light rays travel upwardly towards top surface 508 of the waveguide 500.

Figure 13:
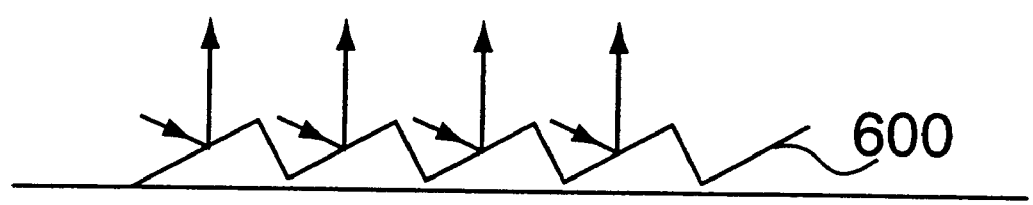
FIG. 13 is a elevation view of a stair-step reflective element.
Figure 14:
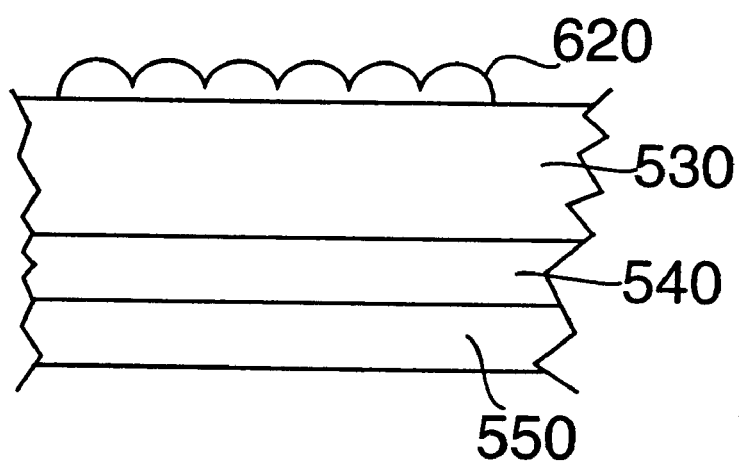
FIG. 14 is a cross-sectional diagram of a refractive medium with a diffuser.

Instead of a reflective mirror electrode 550, a stair-step mirror 600, shown in FIG. 13, located below the light valve 540 can be used to reflect the light. Additionally, as shown in FIG. 14, a diffuser structure 620, such as, for example, an array of microlenses, can be placed on the upper surface 532 (FIG. 12) of the refractive medium layer 530 in place of holographic elements. The microlenses can be fashioned in the manner described in U.S. Pat. No. 5,598,281, issued Jan. 28, 1997 to Zimmerman et al. for a Backlight Assembly for Improved Illumination Employing Tapered Waveguides, incorporated herein by reference.

Figure 15:
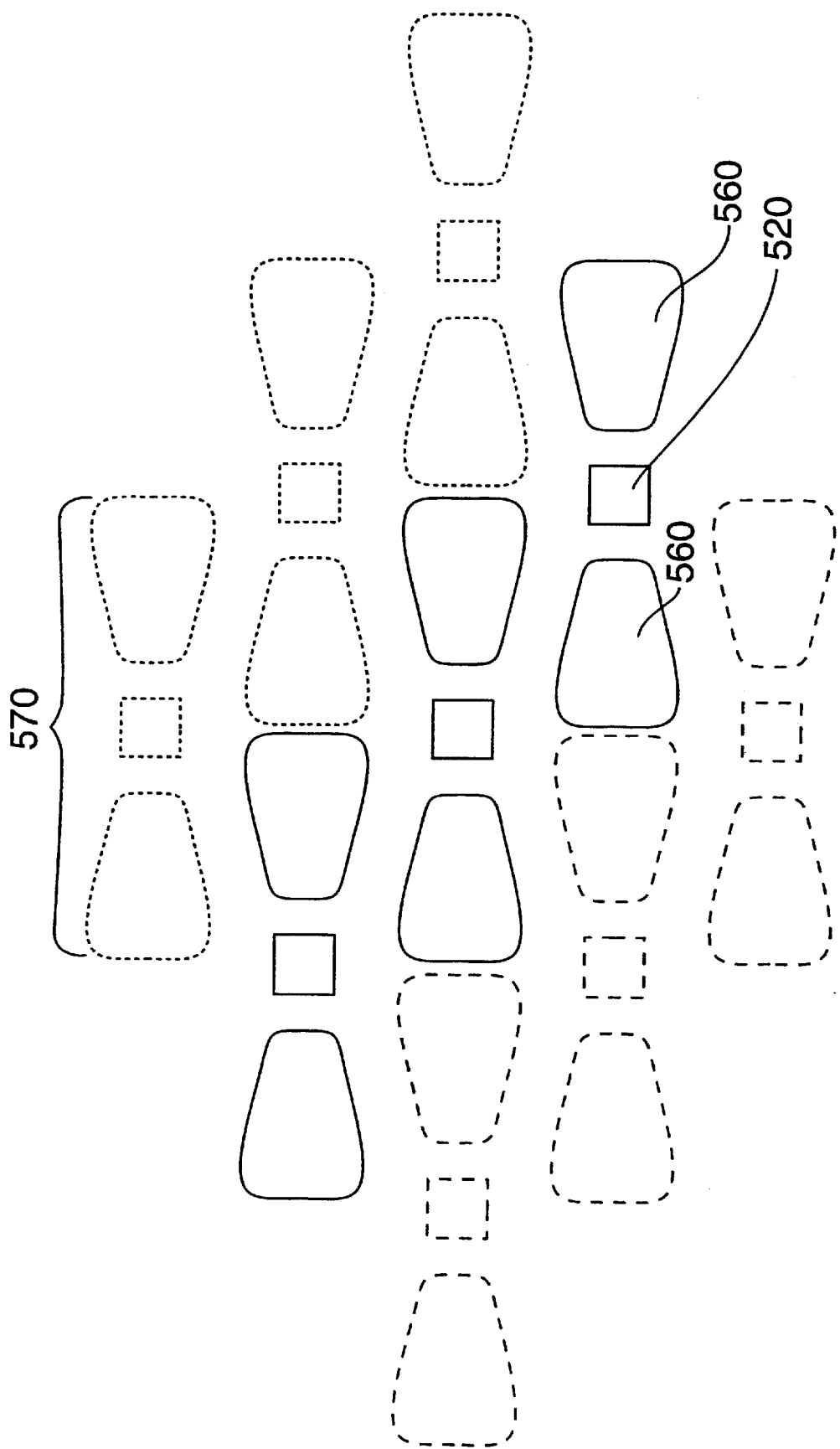
FIG. 15 is an illustration of the upper output surface of the refractive medium of the display of FIG. 12, illustrating an arrangement of the bandpass filters and their associated holographic elements.

A view normal to the upper output surface 532 of the refractive medium 530 is illustrated in FIG. 15. The figure shows an arrangement of the bandpass filters 520 and their associated holographic elements 560. A bandpass filter 520 and two holographic elements 560 comprise a resolution cell 570. The solid-line, dotted line, and dashed-line renditions, respectfully, reflect resolution cells 570 of different color bands, for example, red, green, and blue. By staggering resolution cells 570 as shown, all of the constituent elements can be tightly packed, increasing the planar density of the resolution cells 570 therefore enhancing the resolution of the display.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A reflective display comprising:
   (a) a waveguide having at least one edge input surface for accepting light, and opposing upper and lower output surfaces generally perpendicular to the input surface, where the waveguide has a plurality of passive light-extracting means for uniformly extracting the light through the lower output surface at a plurality of locations; and
   (b) light-attenuating and redirecting means, adjacent the lower output surface of the waveguide, for selectively and locally attenuating a portion or none of the light, received through the lower output surface, and redirecting the unattenuated light back through the waveguide.

2. A reflective display comprising:
   a waveguide having at least one edge input surface for accepting light, and opposing upper and lower output surfaces generally perpendicular to the input surface, where the waveguide has a plurality of light-extracting means for extracting the light through the lower output surface at a plurality of locations; and
   light-attenuating and redirecting means, adjacent the lower output surface of the waveguide, for selectively and locally attenuating a portion or none of the light, received through the lower output surface, and redirecting the unattenuated light back through the waveguide, wherein the light-attenuating and redirecting means comprises an electrically-controlled light valve selected from the group consisting of a PDLC, an SPD, a ferroelectric LCD, an anti-ferroelectric LCD, a twisted nematic LCD, a supertwisted nematic LCD, an optical phase shifter, or an electrophoretic device.

3. A display as set forth in claim 2, where the light-extracting means comprises a plurality of divots or trapezoidal extraction features on the upper output surface of the waveguide.

4. A reflective display comprising:
   a waveguide having at least one edge input surface for accepting light and opposing upper and lower output surfaces generally perpendicular to the input surface, where the waveguide has a plurality of light-extracting means for extracting the light through the lower output surface at a plurality of locations, wherein the light-extracting means comprises a plurality of bandpass filters on the lower output surface of the waveguide; and light-attenuating and redirecting means, adjacent the lower output surface of the waveguide, for selectively and locally attenuating a portion or none of the light, received through the lower output surface, and redirecting the unattenuated light back through the waveguide, wherein the light-attenuating and redirecting means further comprises holographic elements adjacent to the filters for redirecting the light into the waveguide.

5. A display as set forth in claim 4, where the bandpass filters and holographic elements comprise resolution cells and the cells are staggered in the on the lower output surface of the waveguide.

6. A display as set forth in claim 1, where the light-attenuating and redirecting means comprises an electrically-controlled light valve.

7. A display as set forth in claim 2, where the light-attenuating and redirecting means further comprises a reflective electrode layer, where the reflective electrode layer is either flat or stair-step shaped.

8. A display as set forth in claim 2, where the light-attenuating and redirecting means further comprises a U-shaped channel assembly.

9. A reflective display comprising:
a waveguide having at least one edge input surface for accepting light, and opposing upper and lower output surfaces generally perpendicular to the input surface, where the waveguide has a plurality of light-extracting means for extracting the light through the lower output surface at a plurality of locations, wherein the light-extracting means comprises a plurality of volume or surface holographic elements on the lower output surface of the waveguide; and light-attenuating and redirecting means, adjacent the lower output surface of the waveguide, for selectively and locally attenuating a portion or none of the light, received through the lower output surface, and redirecting the unattenuated light back through the waveguide.

10. A display as set forth in claim 9, where the waveguide comprises a plurality of barrier means for isolating the light extracted by each of the light-extracting means in respective resolution cells.

11. A display as set forth in claim 9, where the waveguide comprises a plurality of cells of optically-clear refractive material where each cell connects the upper and lower output surfaces and means for isolating each of the cells, the means for isolation having a refractive index lower than that of the refractive material.

12. A display as set forth in claim 9, where the upper and lower output surfaces of the waveguide are parallel or tapered.

13. A display as set forth in claim 9, further comprising a light-coupling means for absorbing uncollimated light rays, the light-coupling means being located between the lower output surface of the waveguide and the light-attenuating and redirecting means.

14. A reflective display comprising:
a waveguide having at least one edge input surface for accepting light, and opposing upper and lower output surfaces generally perpendicular to the input surface, where the waveguide has a plurality of light-extracting means for extracting the light through the lower output surface at a plurality of locations;

a light-attenuating and redirecting means, adjacent the lower output surface of the waveguide, for selectively and locally attenuating a portion or none of the light, received through the lower output surface, and redirecting the unattenuated light back through the waveguide; and a turning prism for directing light into the waveguide.

15. A display as set forth in claim 14, further comprising a serrated surface, a diffraction grating, a holographic coating, or a binary optic surface between the turning prism and the interior of the waveguide.

16. A display as set forth in claim 2, where the light-attenuating and redirecting means further comprises a printed circuit board substrate comprising means for controlling the light valve.

17. A display as set forth in claim 4, where the waveguide comprises a plurality of barrier means for isolating the light extracted by each of the light-extracting means in respective resolution cells.

18. A display as set forth in claim 4, where the waveguide comprises a plurality of cells of optically-clear refractive material where each cell connects the upper and lower output surfaces and means for isolating each of the cells, the means for isolation having a refractive index lower than that of the refractive material.

19. A display as set forth in claim 4, where the upper and lower output surfaces of the waveguide are parallel or tapered.

20. A display as set forth in claim 4, further comprising a light-coupling means for absorbing uncollimated light rays, the light-coupling means being located between the lower output surface of the waveguide and the light-attenuating and redirecting means.

21. A display as set forth in claim 2, where the waveguide comprises a plurality of barrier means for isolating the light extracted by each of the light-extracting means in respective resolution cells.

22. A display as set forth in claim 2, where the waveguide comprises a plurality of cells of optically-clear refractive material where each cell connects the upper and lower output surfaces and means for isolating each of the cells, the means for isolation having a refractive index lower than that of the refractive material.

23. A display as set forth in claim 22, where the upper and lower output surfaces of the waveguide are parallel or tapered.

24. A display as set forth in claim 22, further comprising a light-coupling means for absorbing uncollimated light rays, the light-coupling means being located between the lower output surface of the waveguide and the light-attenuating and redirecting means.

25. A reflective display comprising:
a waveguide having at least one edge input surface for accepting light, and opposing upper and lower output surfaces generally perpendicular to the input surface, where the waveguide has a plurality of light-extracting means for extracting the light through the lower output surface at a plurality of locations; and light-attenuating and redirecting means, adjacent the lower output surface of the waveguide, for selectively and locally attenuating a portion or none of the lights received through the lower output surface, and redirecting the unattenuated light back through the waveguide, wherein the light-attenuating and redirecting means comprises an electrically-controlled light valve and a U-shaped channel assembly.

26. A display as set forth in claim 25, where the light-extracting means comprises a plurality of divots or trapezoidal extraction features on the upper output surface of the waveguide.

27. A display as set forth in claim 25, where the waveguide comprises a plurality of barrier means for isolating the light extracted by each of the light-extracting means in respective resolution cells.

28. A display as set forth in claim 25, where the waveguide comprises a plurality of cells of optically-clear refractive material where each cell connects the upper and lower output surfaces and means for isolating each of the cells, the means for isolation having a refractive index lower than that of the refractive material.

29. A display as set forth in claim 25, where the upper and lower output surfaces of the waveguide arc parallel or tapered.

30. A display as set forth in claim 25, further comprising a light-coupling means for absorbing uncollimated light rays, the light-coupling means being located between the lower output surface of the waveguide and the light-attenuating and redirecting means.

31. A display as set forth in claim 25, where the light-attenuating and redirecting means further comprises a printed circuit board substrate comprising means for controlling the light valve.

32. A reflective display comprising:
- a waveguide having at least one edge input surface for accepting light, and opposing upper and lower output surfaces generally perpendicular to the input surface, where the waveguide has a plurality of light-extracting means for extracting the light through the lower output surface at a plurality of locations, wherein the waveguide comprises a plurality of gradient index lenses for directing the light from the lower surface to the upper surface of the waveguide and isolating the light in the plurality of pixels; and
- light-attenuating and redirecting means, adjacent the lower output surface of the waveguide, for selectively and locally attenuating a portion or none of the light, received through the lower output surface, and redirecting the unattenuated light back through the waveguide.

33. A display as set forth in claim 14 further comprising a plurality of gradient index lenses for directing the light from the lower surface to the upper surface of the waveguide and isolating the light in a plurality of pixels.

34. A reflective display comprising:
- a waveguide having at least one edge input surface for accepting light, and opposing upper and lower output surfaces generally perpendicular to the input surface, where the waveguide has a plurality of light-extracting means for extracting the light through the lower output surface at a plurality of locations;
- a light-attenuating and redirecting means, adjacent the lower output surface of the waveguide, for selectively and locally attenuating a portion or none of the light, received through the lower output surface, and redirecting the unattenuated light back through the waveguide; and
- a diffuser adjacent to the upper output surface of the waveguide, wherein the diffuser comprises a plurality of diffuser elements such as tapered waveguides.

35. A display as set forth in claim 34, further comprising material or coating surrounding said diffuser elements.

36. A display as set forth in claim 1, where the light-extracting means comprises a plurality of divots or trapezoidal extraction features on the upper output surface of the waveguide.

\* \* \* \* \*